United States Patent
Watanabe et al.

(10) Patent No.: US 11,872,647 B2
(45) Date of Patent: Jan. 16, 2024

(54) PRODUCTION METHOD OF ADDITIVE MANUFACTURED OBJECT USING PURE COPPER POWDER HAVING SI COATING

(71) Applicant: JX Nippon Mining & Metals Corporation, Tokyo (JP)

(72) Inventors: Hirofumi Watanabe, Ibaraki (JP); Hiroyoshi Yamamoto, Ibaraki (JP); Yoshitaka Shibuya, Ibaraki (JP); Kenji Sato, Tokyo (JP); Satoru Morioka, Tokyo (JP); Akihiko Chiba, Miyagi (JP); Kenta Aoyagi, Miyagi (JP)

(73) Assignee: JX METALS CORPORATION, Tokyo (JP)

( * ) Notice: Subject to any disclaimer, the term of this patent is extended or adjusted under 35 U.S.C. 154(b) by 756 days.

(21) Appl. No.: 16/978,822

(22) PCT Filed: Dec. 26, 2019

(86) PCT No.: PCT/JP2019/051093
§ 371 (c)(1),
(2) Date: Sep. 8, 2020

(87) PCT Pub. No.: WO2020/138274
PCT Pub. Date: Jul. 2, 2020

(65) Prior Publication Data
US 2021/0039192 A1  Feb. 11, 2021

(30) Foreign Application Priority Data

Dec. 27, 2018 (JP) ................................. 2018-244933
Sep. 5, 2019 (JP) ................................. 2019-162390

(51) Int. Cl.
*B23K 15/00* (2006.01)
*B33Y 10/00* (2015.01)
*B33Y 70/10* (2020.01)
*B22F 1/05* (2022.01)
*B22F 1/16* (2022.01)
*B22F 10/34* (2021.01)
*B22F 10/36* (2021.01)
*B22F 1/00* (2022.01)
*B22F 10/25* (2021.01)
*B22F 10/28* (2021.01)

(52) U.S. Cl.
CPC ............ *B23K 15/0086* (2013.01); *B22F 1/00* (2013.01); *B22F 1/05* (2022.01); *B22F 1/16* (2022.01); *B22F 10/34* (2021.01); *B22F 10/36* (2021.01); *B33Y 10/00* (2014.12); *B33Y 70/10* (2020.01); *B22F 10/25* (2021.01); *B22F 10/28* (2021.01); *B22F 2301/10* (2013.01); *B22F 2302/45* (2013.01); *B22F 2304/10* (2013.01)

(58) Field of Classification Search
CPC ......... B33Y 40/10; B33Y 70/00; B33Y 70/10; B33Y 10/00; B33Y 80/00; B22F 3/003; B22F 3/1017; B22F 3/105; B22F 3/16; B22F 1/00; B22F 1/05; B22F 1/10; B22F 1/102; B22F 1/103; B22F 1/142; B22F 1/145; B22F 1/16; B22F 1/17; B22F 10/20; B22F 10/25; B22F 10/28; B22F 10/32; B22F 10/34; B22F 10/36; B22F 10/50; B22F 10/64; B22F 10/66; B22F 2304/10; B22F 2301/052; B22F 2301/10; B22F 2301/15; B22F 2301/205; B22F 2302/20; B22F 2302/25; B22F 2302/45; B23K 15/0086; B23K 15/0093; Y02P 10/25
See application file for complete search history.

(56) References Cited

U.S. PATENT DOCUMENTS

| | | |
|---|---|---|
| 2013/0029041 A1 | 1/2013 | Kim et al. |
| 2016/0230026 A1 | 8/2016 | Furusawa |
| 2017/0043395 A1 | 2/2017 | She et al. |
| 2020/0055116 A1* | 2/2020 | Yoshida .................. B22F 1/17 |
| 2021/0178465 A1 | 6/2021 | Endo et al. |

FOREIGN PATENT DOCUMENTS

| | | |
|---|---|---|
| EP | 3412379 A1 | 12/2018 |
| JP | S57-155386 A | 9/1982 |
| JP | 2008-101245 A | 5/2008 |

(Continued)

OTHER PUBLICATIONS

Extended European Search Report issued in EP Patent Application No. 19902333.4 dated Oct. 11, 2021.

(Continued)

*Primary Examiner* — Hung D Nguyen
(74) *Attorney, Agent, or Firm* — Howson & Howson LLP

(57) ABSTRACT

A production method of an additive manufactured object is provided. The method is an EB-based additive manufacturing method of spreading a pure copper powder, preheating the pure copper powder and thereafter partially melting the pure copper powder by scanning the pure copper powder with an electron beam, solidifying the pure copper powder to form a first layer, newly spreading a pure copper powder on the first layer, preheating the pure copper powder and thereafter partially melting the pure copper powder by scanning the pure copper powder with an electron beam, solidifying the pure copper powder to form a second layer, and repeating the foregoing process to add layers. The pure copper powder is a pure copper powder with a Si coating formed thereon, and the preheating temperature is set to be 400° C. or higher and less than 800° C.

12 Claims, No Drawings

(56) References Cited

FOREIGN PATENT DOCUMENTS

| | | |
|---|---|---|
| JP | 2013-171745 A | 9/2013 |
| JP | 2017-025392 A | 2/2017 |
| JP | 2017-036508 A | 2/2017 |
| JP | 2018-199862 A | 12/2018 |
| JP | 2019-173058 A | 10/2019 |
| WO | 2018/079002 A1 | 5/2018 |

OTHER PUBLICATIONS

Lodes et al., "Process Development for the Manufacturing of 99.94% Pure Copper via Selective Electron Beam Melting", Materials Letters, vol. 143 pp. 298-301, Dec. 2014.

Extended European Search Report issued in EP Patent Application No. 19903905.8 dated Sep. 15, 2021.

Office Action issued in U.S. Appl. No. 16/968,960 dated Jun. 2, 2022.

* cited by examiner

PRODUCTION METHOD OF ADDITIVE MANUFACTURED OBJECT USING PURE COPPER POWDER HAVING SI COATING

BACKGROUND

The present invention relates to a production method of an additive manufactured object using a pure copper powder having a Si coating.

In recent years, attempts are being made for using 3D printer technology and producing three-dimensional structure metal components having a complex shape and deemed difficult to mold. 3D printing is also referred to as additive manufacturing (AM), and is a method of producing a complex-shape metal molded object by thinly spreading a metal powder on a substrate to form a metal powder layer, melting the metal powder layer by scanning the metal powder layer with an electron beam or a laser beam and subsequently solidifying the metal powder layer, further thinly spreading a new powder thereon and similarly melting and solidifying, and repeating these processes.

In additive manufacturing based on the electron beam (EB) method, when the metal powder is irradiated with an electron beam, in certain cases the metal powder becomes charged up since it has high electrical resistance. Thus, in order to resolve the foregoing problem, the metal powder is preheated and adjacent metal powders are necked to create a conductive path. Nevertheless, in the foregoing case, the metal powder becomes partially sintered due to the preheating process and, when the sintering advances, there is a problem in that it becomes difficult for the powder to escape from within the holes of the molded object.

Such being the case, in order to suppress sintering and achieve the weakest necking possible, Patent Document 1 discloses a surface-treated metal powder. Specifically, by forming an organic coating on the surface of a metal powder by using a silane coupling agent or the like, the metal powder, in a layered state, can be directly irradiated with an electron beam without being partially sintered due to the preheating process.

CITATION LIST

Patent Documents

[Patent Document 1] Japanese Unexamined Patent Application Publication No. 2017-25392

SUMMARY

Technical Problem

An object of the present invention is to provide a production method of an additive manufactured object using a pure copper powder with a Si coating formed thereon capable of suppressing the partial sintering of the pure copper powder caused by the preheating thereof in additive manufacturing based on the electron beam (EB) method, and suppressing the loss of the degree of vacuum caused by carbon (C) during the molding process. Moreover, another object of the present invention is to provide the optimal preheating temperature and additive manufacturing conditions to be applied to such pure copper powder having a Si coating formed thereon.

As a means for achieving the foregoing objects, the present invention provides the following embodiments.

1) A production method of an additive manufactured object according to an EB-based additive manufacturing method of spreading a pure copper powder, preheating the pure copper powder and thereafter partially melting the pure copper powder by scanning the pure copper power with an electron beam, solidifying the pure copper to form a first layer, newly spreading a pure copper powder on the first layer, preheating the pure copper powder and thereafter partially melting the pure copper powder by scanning the pure copper powder with an electron beam, solidifying the pure copper to form a second layer, and repeating the foregoing process to add layers, wherein used as the pure copper powder is a pure copper powder with a Si coating formed thereon in which a Si adhesion amount is 5 to 200 wtppm, a C adhesion amount is 15 wtppm or more, and a weight ratio C/Si is 3 or less, and wherein the preheating temperature is set to be 400° C. or higher and less than 800° C.

2) A production method of an additive manufactured object according to an EB-based additive manufacturing method of spreading a pure copper powder, preheating the pure copper powder and thereafter partially melting the pure copper powder by scanning the pure copper power with an electron beam, solidifying the pure copper to form a first layer, newly spreading a pure copper powder on the first layer, preheating the pure copper powder and thereafter partially melting the pure copper powder by scanning the pure copper powder with an electron beam, solidifying the pure copper to form a second layer, and repeating the foregoing process to add layers, wherein used as the pure copper powder is a pure copper powder with a Si coating formed thereon in which, when Si is analyzed via WDX analysis, portions that are $\frac{1}{10}$ or more of a maximum signal strength are 40% or higher of particles as a whole, a C adhesion amount is 15 wtppm or more, and a weight ratio C/Si of a Si adhesion amount and a C adhesion amount is 3 or less, and wherein the preheating temperature is set to be 400° C. or higher and less than 800° C.

3) A production method of an additive manufactured object according to an EB-based additive manufacturing method of spreading a pure copper powder, preheating the pure copper powder and thereafter partially melting the pure copper powder by scanning the pure copper power with an electron beam, solidifying the pure copper to form a first layer, newly spreading a pure copper powder on the first layer, preheating the pure copper powder and thereafter partially melting the pure copper powder by scanning the pure copper powder with an electron beam, solidifying the pure copper to form a second layer, and repeating the foregoing process to add layers, wherein used as the pure copper powder is a pure copper powder with a Si coating formed thereon in which a film thickness of the Si coating is 5 nm or more and 300 nm or less, a C adhesion amount is 15 wtppm or more, and a weight ratio C/Si of a Si adhesion amount and a C adhesion amount is 3 or less, and wherein the preheating temperature is set to be 400° C. or higher and less than 800° C.

4) The production method of an additive manufactured object according to any one of 1) to 3) above, wherein molding conditions of the electron beam satisfy a relational expression (I) of ([voltage]×[current])/

([beam diameter]×[scan speed])=2.3 or more and 6.0 or less; provided that a unit of each parameter shall be as follows:

voltage (kV);
current (mA);
scan speed (mm/sec); and
beam diameter (diameter) (mm).

5) The production method of an additive manufactured object according to any one of 1) to 3) above, wherein molding conditions of the electron beam satisfy a relational expression (II) of ([voltage]×[current])/([beam diameter]×[scan speed]×[thickness of one layer of powder body])=45 or more and 90 or less; provided that a unit of each parameter shall be as follows:

voltage (kV);
current (mA);
scan speed (mm/sec);
beam diameter (diameter) (mm); and
thickness of one layer of powder body (mm).

6) The production method of an additive manufactured object according to any one of 1) to 3) above, wherein an average particle size D50 (median diameter) of the pure copper powder is 10 to 150 μm.

According to the present invention, it is possible to suppress the partial sintering of the pure copper powder caused by the preheating thereof in additive manufacturing based on the electron beam (EB) method, and suppress the loss of the degree of vacuum during molding caused by carbon (C) during the molding process. Moreover, according to the present invention, since it is possible to perform preheating at a high temperature and suppress the dispersion of heat caused by thermal conduction, the subsequent electron beam melting process can be efficiently performed. Moreover, according to the present invention, it is possible to prepare a pure copper additive manufactured object having favorable surface conditions.

DETAILED DESCRIPTION

A metal powder that is used in additive manufacturing based on the electron beam (EB) method is normally preheated for suppressing a charge-up among other reasons. While preheating is performed at a relatively low temperature, there is a problem in that the metal powder becomes partially sintered and necked, it becomes difficult to remove the metal powder remaining in the molded object and, even if it is possible to remove such remaining metal powder, it is not possible to reuse the removed metal powder.

In light of the above, the metal powder is subject to surface treatment so that it will not become partially sintered even when preheated. For example, Patent Document 1 discloses a technology of performing surface treatment to a metal powder using diaminosilane, aminotitanate or other organic matter, and thereby forming a coating of Si or Ti on the surface of the metal powder, and the formation of this kind of coating is effective for suppressing the partial sintering of the metal powder caused by the preheating thereof.

When forming a Si coating based on surface treatment using the organic matter described above, organic matter (C) will also become attached at the same time, and when using a pure copper powder to which such organic matter has become attached, there will be a loss of a degree of vacuum during additive manufacturing, and the molding conditions will become unstable. Furthermore, there were also cases where a part of the organic matter would become decomposed due to the heat during the molding process, become gasified, and generate an unusual odor.

As a result of intense study of the foregoing problems, the present inventors discovered that the loss of the degree of vacuum during additive manufacturing occurs when the ratio of C relative to Si exceeds a predetermined range. The present inventors also discovered that, by performing heat treatment to a surface-treated pure copper powder under certain conditions, it is possible to suppress the ratio of C that becomes attached to the pure copper powder to be within a certain range, and thereby suppress the loss of the degree of vacuum.

In light of the foregoing circumstances, the present inventors hereby provide a production method of an additive manufactured object using, as the raw material, a pure copper powder with a Si coating formed thereon, and which is a production method of an additive manufactured object that is optimal for the foregoing pure copper powder.

A pure copper powder according to an embodiment of the present invention is a pure copper powder with a Si coating formed thereon, wherein the Si adhesion amount is 5 wtppm or more and 200 wtppm or less, the C adhesion amount is 15 wtppm or more, and the weight ratio C/Si is 3 or less. By forming a Si coating of the foregoing adhesion amount on the surface of the pure copper powder, it is possible to suppress the partial sintering of the pure copper powder caused by preheating or other reasons, and produce a laminate of a complex shape.

When the adhesion amount of Si is less than 5 wtppm, it is not possible to sufficiently suppress the partial sintering of the pure copper powder. When the adhesion amount of Si exceeds 200 wtppm, this may result in the deterioration of the conductivity or density of the molded object and, therefore, the adhesion amount of Si is preferably 200 wtppm or less. Moreover, in addition to the case of forming a Si coating on the pure copper powder, similar effects can be expected when forming a Ti coating on the pure copper powder.

What is important in an embodiment of the present invention is that the C adhesion amount is 15 wtppm or more, and the weight ratio C/Si is 3 or less. While an organic matter (coating) containing C exhibits an effect inhibiting oxidation, when the weight ratio C/Si exceeds 3 in terms of the amount of adhesion thereof, the loss of the degree of vacuum may occur due to the separation of C from the pure copper powder, the molding conditions may become unstable, and there are cases where the density or strength of the molded object consequently deteriorates. Moreover, an unusual odor is sometimes generated during the molding process. Accordingly, the C adhesion amount and the weight ratio C/Si are set to be within the foregoing range.

In another embodiment of the present invention, used as the pure copper powder is a pure copper powder with a Si coating formed thereon in which, when Si is analyzed via WDX analysis, portions that are $1/10$ or more of a maximum signal strength are 40% or higher of the particles, a C adhesion amount is 15 wtppm or more, and a weight ratio C/Si of a Si adhesion amount and a C adhesion amount is 3 or less. Since WDX (Wavelength Dispersive X-ray) analysis is able to identify the existence of the Si element in the pure copper powder in terms of where and how much, it can be used as an index of the coverage of Si which is coating the pure copper powder. Here, "portions that are $1/10$ or more of a maximum signal strength" mean the area obtained by excluding portions that are less than $1/10$ of the maximum signal strength detected by a detector upon analyzing the pure copper powder via WDX. For example, when the signal strength upon scanning a whole particle is 15 to 400, the corresponding area will be the portions having a signal strength of 40 to 400.

When the Si coverage is less than 40%, the necked part caused by the partial sintering upon performing the preheating process will increase, heat will escape to the peripheral pure copper powder through the necking during the EB thermal spraying, and there are cases where the melting of the pure copper powder becomes difficult.

In another embodiment of the present invention, used as the pure copper powder is a pure copper powder with a Si coating formed thereon in which a film thickness of the Si coating is 5 nm or more and 300 nm or less, a C adhesion amount is 15 wtppm or more, and a weight ratio C/Si of a Si adhesion amount and a C adhesion amount is 3 or less. Here, the film thickness of the coating is a value obtained by sputtering the powder body surface at a fixed sputter rate and detecting the Auger electrons based on Auger Electron Spectroscopy (AES), and is calculated from the time and sputter rate required until Si is no longer detected. Two points are randomly selected as the locations to be detected from a single particle, and the value of the Examples represent the average value thereof. When the film thickness of the coating is less than 5 nm, it is not possible to suppress the partial sintering of the pure copper powder during the preheating thereof. When the film thickness of the coating is more than 300 nm, it is difficult to form a necking, which in turn causes a charge-up, and, therefore, the film thickness of the coating is preferably 5 nm or more and 300 nm or less.

Moreover, in an embodiment of the present invention, the average particle size D50 (median diameter) of the pure copper powder is preferably 10 μm or more and 150 μm or less. When the average particle size D50 is 10 μm or more, the powder does not float easily during the molding process, and it becomes easier to handle the powder. Meanwhile, by causing the average particle size D50 to be 150 μm or less, the melting of the powder will advance smoothly, and it becomes possible to produce a further highly refined additive manufactured object. Note that, in the embodiments of the present invention, the term "average particle size D50" means the average particle size at an integrated value of 50% in a particle size distribution measured based on image analysis.

Moreover, in an embodiment of the present invention, the pure copper powder preferably has a purity of 99.9% or higher. Since pure copper has high conductivity, it is possible to produce a molded object having superior thermal conductivity by producing a complex shape, which could not be conventionally produced, via additive manufacturing. Moreover, when the density of the molded object is low, the thermal conductivity will also be low since substances (such as air) with inferior thermal conductivity will get mixed into the molded object. However, when using the pure copper powder according to an embodiment of the present invention, it is possible to produce an additive manufactured object having a relative density of 95% or higher.

The production method of the pure copper powder according to an embodiment of the present invention is now explained.

Foremost, a required amount of a pure copper powder is prepared. A pure copper powder having an average particle size D50 (median diameter) of 10 to 150 μm is preferably used. The intended average particle size can be attained via sieving. While the pure copper powder can be prepared via the atomization method, the pure copper powder according to an embodiment of the present invention may also be prepared via other methods, and is not limited to the atomization method.

Next, pretreatment of the pure copper powder is performed. Since a natural oxide film is normally formed on the pure copper powder, there are cases where it is difficult to form the intended bond. Accordingly, it is preferable to eliminate (pickling) the oxide film in advance. As the method of removal, for example, in the case of a copper powder, the natural oxide film can be removed by immersing the copper powder in a dilute sulfuric acid aqueous solution. However, this pretreatment is a treatment that is performed for the pure copper powder on which a natural oxide film is formed, and there is no need to perform this pretreatment to all pure copper powders. After pickling, the pure copper powder may also be washed with pure water as needed.

Next, in order to form a Si coating on the surface of the pure copper powder, the pure copper powder is immersed in a solution containing a silane coupling agent. The solution temperature is preferably set to 5 to 40° C., and, since the adhesion amount of Si that will become attached will increase as the immersion time becomes longer, it is preferable to adjust the immersion time according to the intended adhesion amount of Si.

As the silane coupling agent, any commercially available silane coupling agent may be used; for instance, aminosilane, vinylsilane, epoxysilane, mercaptosilane, methacrylsilane, ureidosilane, alkylsilane or the like may be used.

While an aqueous solution of 0.1 to 30% obtained by diluting the foregoing solution with pure water may be used, since the adhesion amount of Si will increase as the concentration of the solution is higher, it is preferable to adjust the concentration according to the intended adhesion amount of Si. Moreover, the foregoing surface treatment may be performed by agitating the solution as needed.

After the immersion treatment, the pure copper powder is heated in a vacuum or an atmosphere to create a coupling reaction, and thereafter dried to form a Si coating. The heating temperature will differ depending on the coupling agent that is used, and, for example, may be set to 70 to 120° C.

Next, the pure copper powder with a Si coating formed thereon is heated to moderately remove organic matter. The heating temperature may be set to attain the intended weight ratio C/Si, and the heating temperature is desirably set higher when the amount of Si is great and the heating temperature is desirably set lower when the amount of Si is small, and, for example, the heating temperature may be set to be 400° C. or higher and 1000° C. or less. When the heating temperature is less than 400° C., it is not possible to sufficiently remove organic matter, which in turn may cause deterioration in the degree of vacuum during molding and contamination. When the heating temperature exceeds 1000° C., the sintering will advance quickly and it is not possible to maintain the state of a powder. Moreover, heating can be performed in a vacuum (roughly $10^{-3}$ Pa). Furthermore, the heating time may also be adjusted in addition to the temperature to attain the intended weight ratio C/Si and, for example, the heating time may be preferably set to 2 to 12 hours.

Based on the foregoing process, it is possible to obtain a pure copper powder with a Si coating formed thereon and having the intended Si and C adhesion amounts and weight ratio C/Si.

The production method of the additive manufactured object according to an embodiment of the present invention is now explained.

The additive manufactured object according to this embodiment can be manufactured with the electron beam (EB)-based additive manufacturing method. Foremost, 1) a pure copper powder is spread, 2) the pure copper powder is preheated, and 3) the pure copper powder is scanned with an electron beam and partially melted and then solidified to form a first layer. On the first layer, 1) a pure copper powder is newly spread, 2) the pure copper powder is preheated, and 3) the pure copper powder is scanned with an electron beam and partially melted and then solidified to form a second layer.

By repeating the processes of 1)→2)→3)→1) . . . and adding layers, it is possible to manufacture a three-dimensional metal molded object. Note that the irradiation of the electron beam can be performed based on the three-dimensional data (design diagram) related to the shape of the additive manufactured object.

In this embodiment, preheating is preferably performed at 400° C. or higher and less than 800° C. When the preheating temperature is less than 400° C., in cases where the resistance of the pure copper powder that was spread in the foregoing process is high, the pure copper powder will become negatively charged due to the electron beam, the powder body will become dispersed by the electrostatic force thereof (generation of so-called smoke), and molding becomes impossible. Meanwhile, when the preheating temperature is 800° C. or higher, temporary sintering will advance excessively and the intended molded object cannot be obtained.

Normally, when using a pure copper powder that has not undergone surface treatment, preheating at roughly 300 to 400° C. is required to prevent a charge-up, but by using the pure copper powder according to this embodiment, preheating at 400° C. or higher is enabled. Since copper is a material having high thermal conductivity, the temperature of the molded object will fall due to the thermal diffusion and cause the molding conditions to be difficult. However, by being able to perform preheating at a high temperature as described above, it is possible to suppress the foregoing temperature fall of the molded object.

In order to mold an object by scanning the powder body according to this embodiment (pure copper powder with a Si coating formed thereon) with an electron beam, the various parameters are adjusted so as to satisfy the following relational expression.

([voltage]×[current])/([beam diameter]×[scan speed])= 2.3 or more and 6.0 or less; Relational expression (I):

or, ([voltage]×[current])/([beam diameter]×[scan speed]× [thickness of one layer of powder body])=45 or more and 90 or less; provided that a unit of each parameter shall be as follows: Relational expression (II):

voltage (kV);
current (mA);
scan speed (mm/sec);
beam diameter (diameter) (mm); and
thickness of one layer of powder body (mm).

This means that the object can be molded by respectively adjusting the area of the powder body that is irradiated when scanned with an electron beam per unit time, and the output of the electron beam. For example, when the scan speed is increased, adjustment can be performed by also increasing the output of the electron beam by that much, or reducing the beam diameter by that much. When either of the parameters is changed as described above, by adjusting the other parameters to satisfy the foregoing relational expression, it is possible to mold the object using the pure copper powder according to this embodiment. Note that the beam diameter can be adjusted based on the offset function for adjusting the focal position. Moreover, the thickness of the powder body can be adjusted based on the range of reduction of the stage.

The evaluation method used in the embodiments of the present invention, including the Examples and Comparative Examples, is as follows.

(Average Particle Size D50)
The average particle size D50 (volumetric basis) was measured using the following device and conditions.
Manufacturer: Spectris Co., Ltd. (Malvern Business Division)
Name of device: Dry particle image analyzer Morphologi G3
Measurement conditions:
Amount of particles introduced: 11 mm$^3$
Injection pressure: 0.8 bar
Range of measured particle size: 3.5-210 μm
Number of particles measured: 20000 particles (Specific Surface Area)
The specific surface area of the pure copper powder was measured using the following device and conditions.
Manufacturer: Yuasa Ionics Co., Ltd.
Name of device: Monosorb
Measurement principle: Single Point BET (Si Adhesion Amount)
Manufacturer: Seiko Instruments Inc.
Name of device: SPS3500DD
Method of analysis: ICP-OES (high frequency Inductively Coupled Plasma Optical Emission Spectrometry)
Amount of measured sample: 1 g
Number of measurements: Measurement was performed twice, and the average value thereof was used as the adhesion amount.

(C Adhesion Amount, O Concentration)
Manufacturer: LECO JAPAN CORPORATION
Name of device: TCH600
Method of analysis: Inert gas fusion method
Amount of measured sample: 1 g
Number of measurements: Measurement was performed twice, and the average value thereof was used as the adhesion amount.

(Oxidation Resistance)
When a pure copper powder is exposed to the atmosphere, a natural oxide film is formed on the surface. When a pure copper powder with such an oxide film formed thereon is used in AM (additive manufacturing), there is a problem in that the reflectance or rate of absorption of the electron beam or laser will change, causing the thermal absorption to be different than that of a pure copper powder with no oxide film formed thereon, and physical properties such as the density of the molded object will vary and become unstable even when molding is performed under the same conditions. When an organic film containing Si is formed on the surface of the pure copper powder, the pure copper powder does not react easily with the moisture in the atmosphere, and it is thereby possible to suppress oxidation. In order to verify the inhibition of oxidation, the variation in the oxygen concentration after heating (150° C., 24 hours) the pure copper powder with a Si coating formed thereon was examined, and those in which the variation of oxygen concentration (after heating/before heating) was 5 or less were deemed favorable and given a circle (○), and those in which the variation of oxygen concentration (after heating/before heating) exceeded 5 were deemed inferior and given an x-mark (x).

(WDX Analysis)

When Si is analyzed via WDX analysis, the ratio of portions that are 1/10 or more of a maximum signal strength within a whole particle is referred to as the "Si coverage". One particle is analyzed as a sample, and the Si coverage is measured by using the image processing function of WDX. Specifically, the entire screen of one particle on the WDX screen is scanned, and the Si signal strength is measured. However, since the back side of the particle cannot be scanned, more accurately, when the area of an image which views the particle from a single direction is deemed 100%, the area ratio of Si within that image (portions that are 1/10 or more of the maximum signal strength) is deemed the coverage.

Manufacturer: JEOL Ltd.
Name of device: FE-EPMA
Accelerating voltage: 15 kV
Output current: 15 µA
Scan speed: 10 mm/sec (Film Thickness of Si Coating)

The film thickness of the coating is a value obtained by sputtering the powder body surface at a fixed sputter rate and detecting the Auger electrons based on Auger Electron Spectroscopy (AES), and is calculated from the time and sputter rate required until Si is no longer detected. Two points are randomly selected as the locations to be detected from a single particle, and the value of the Examples represent the average value thereof.

Manufacturer: JEOL Ltd.
Name of device: AES (JAMP-7800F)
Filament current: 2.22 A
Probe voltage: 10 kV
Probe current: $1.0 \times 10^{-8}$ A
Probe diameter: Approximately 500 nm
Sputtering rate: 7.2 nm/min ($SiO_2$ equivalent)

(State of Powder after Temporary Sintering Test)

Since powder in which sintering has advanced due to heating will become a large size as a result of the powders bonding with each other, such powder cannot be passed through a sieve of a predetermined size. Accordingly, if a powder could pass through a sieve, it was judged that such powder exhibited the sintering inhibition effect caused by heating. In order to verify such sintering inhibition effect, 50 g of a pure copper powder was placed in a alumina crucible having a diameter of 50 mm, heated in an atmosphere having a degree of vacuum of $1 \times 10^{-3}$ Pa or less at 500° C. for 4 hours, whether the pure copper powder after heating could pass through a sieve having a sieve opening of 250 µm was confirmed, and powder that passed through the sieve was deemed favorable, and powder that could not pass through the sieve was deemed inferior.

(Change in Degree of Vacuum During Molding)

With a pure copper powder having a high C (carbon) ratio, a part of the organic coating would become decomposed due to the heat during the molding process, become gasified, and generate an unusual odor. Moreover, since the decomposed C will become dispersed within the device, the loss of a degree of vacuum will temporarily occur. In a low degree of vacuum, heating based on EB (electron beam) will be insufficient, and may lead to defects in the additive manufactured object. In order to verify the change in the degree of vacuum, those in which the degree of vacuum made a transition at $2.5 \times 10^{-3}$ Pa or less during the molding process were deemed favorable and given a circle (○), and those in which the degree of vacuum changed in excess of $2.5 \times 10^{-3}$ Pa were deemed inferior and given an x-mark (x).

(Evaluation of Surface Condition of Molded Object)

Whether or not the molded object was favorable or inferior was determined by observing the surface condition of the molded object, and the molded object was deemed favorable when the surface was flat, and deemed inferior when there were unmelted parts on the surface or severe irregularities on the surface.

EXAMPLES

The present invention is now explained based on the following Examples and Comparative Examples. These Examples are illustrative only, and the present invention is not limited in any way based on the Examples. In other words, the present invention is limited only by the scope of its claims, and covers the various modifications other than the Examples included in the present invention.

Example 1, Comparative Example 1: Heat Treatment Temperature after Surface Treatment As the pure copper powder, a pure copper powder prepared via the atomization method and having an average particle size (D50) of 72 µm and a specific surface area of 0.0024 m²/g was prepared, and this pure copper powder was immersed in a dilute sulfuric acid aqueous solution, and the natural oxide film on the surface thereof was removed. Next, after immersing the pure copper powder in a pure water-diluted coupling agent aqueous solution (5%) for 60 minutes, the pure copper powder was dried in a vacuum or an atmosphere at 70 to 120° C. After drying, the pure copper powder was subject to heat treatment in a vacuum at 550 to 800° C. (Examples 1-1, 1-2). Meanwhile, Comparative Examples 1-1, 1-2 were not subject to heat treatment. A summary of the Si adhesion amount, Si coverage, Si coating thickness, C adhesion amount, and weight ratio C/Si of the pure copper powder with a coating formed thereon based on the foregoing treatment is shown in Table 1.

As a result of verifying the "oxidation resistance" of the foregoing pure copper powder with a coating formed thereon, variation in the oxygen concentration (after heating/before heating) was 5 or less in all of the Examples, and it was confirmed that oxidation has been suppressed. Moreover, as a result of verifying the "state of powder after temporary sintering test", all of the Examples exhibited favorable results. Next, the foregoing pure copper powder was used to produce an additive manufactured object based on the electron beam (EB) method. Here, as a result of measuring the "degree of vacuum during molding", while no change in the degree of vacuum was observed in Examples 1-1, 1-2, a change in the degree of vacuum was observed in Comparative Example 1-1. Moreover, while no change in the degree of vacuum was observed in Comparative Example 2-2, results of the temporary sintering test were inferior. The foregoing results are shown in Table 1.

TABLE 1

| | Metal powder | Particle size (µm) | Specific surface area (m²/g) | Surface treatment agent | Treatment concentration (%) | Treatment time (min) | Heat treatment temperature after surface treatment (° C.) | Si adhesion amount (wtppm) |
|---|---|---|---|---|---|---|---|---|
| Example 1-1 | Cu | 72.0 | 0.024 | Diaminosilane | 5 | 60 | 550 | 66 |
| Example 1-2 | | | | | | | 800 | 64 |

TABLE 1-continued

| | | | | | | State | No heat treatment | 64 |
|---|---|---|---|---|---|---|---|---|
| Comparative Example 1-1 | | | | | | | | |
| Comparative Example 1-2 | | | | | | | No heat treatment | 2 |

| | Si coverage (%) | Si coating thickness (nm) | C adhesion amount (wtppm) | Weight ratio C/Si | Variation in oxygen concentration (afterheating)/ (before heating) | State of powder after temporary sintering test | Change in degree of vacuum during molding |
|---|---|---|---|---|---|---|---|
| Example 1-1 | — | — | 130 | 2.0 | ○ | Favorable | ○ |
| Example 1-2 | 45 | 40 | 67 | 1.4 | ○ | Favorable | ○ |
| Comparative Example 1-1 | — | — | 210 | 3.3 | ○ | Favorable | x |
| Comparative Example 1-2 | — | — | 10 | 5 | — | Inferior | ○ |

Example 2: Types of Surface Treatment Agent

As the pure copper powder, a pure copper powder prepared via the atomization method and having an average particle size (D50) of 72 μm and a specific surface area of 0.0028 m²/g was prepared, and this pure copper powder was immersed in a dilute sulfuric acid aqueous solution, and the natural oxide film on the surface thereof was removed. Next, after immersing the pure copper powder in a pure water-diluted epoxysilane aqueous solution (5%) for 60 minutes, the pure copper powder was dried in a vacuum or an atmosphere at 70 to 120° C. After drying, the pure copper powder was subject to heat treatment in a vacuum at 800° C. (Example 2-1). A summary of the Si adhesion amount, C adhesion amount, and weight ratio C/Si of the pure copper powder with a Si coating formed thereon based on the foregoing treatment is shown in Table 2.

As a result of verifying the "state of powder after temporary sintering test" of the pure copper powder with a Si coating formed thereon, favorable results were obtained. The foregoing results are shown in Table 2.

TABLE 2

| | Metal powder | Particle size (μm) | Specific surface area (m²/g) | Surface treatment agent | Treatment concentration (%) | Treatment time (min) | Heat treatment temperature after surface treatment (° C.) | Si adhesion amount (wtppm) |
|---|---|---|---|---|---|---|---|---|
| Example 2-1 | Cu | 72 | 0.024 | Epoxysilane | 5 | 60 | 800 | 25 |

| | C adhesion amount (wtppm) | Weight ratio C/Si | Variation in oxygen concentration (after heating)/ (before heating) | State of powder after temporary sintering test | Change in degree of vacuum during molding |
|---|---|---|---|---|---|
| Example 2-1 | 33 | 1.3 | — | Favorable | — |

Example 3: Particle Size of Pure Copper Powder

As the pure copper powder, a pure copper powder prepared via the atomization method and having an average particle size (D50) of 38 μm was prepared, and this pure copper powder was immersed in a dilute sulfuric acid aqueous solution, and the natural oxide film on the surface thereof was removed. Next, after immersing the pure copper powder in a pure water-diluted diaminosilane aqueous solution (5%) for 60 minutes, the pure copper powder was dried in a vacuum or an atmosphere at 70 to 120° C. After drying, the pure copper powder was subject to heat treatment in a vacuum at 550° C. (Example 3-1). A summary of the Si adhesion amount, C adhesion amount, and weight ratio C/Si of the pure copper powder with a Si coating formed thereon based on the foregoing treatment is shown in Table 3.

As a result of verifying the "state of powder after temporary sintering test" of the pure copper powder with a Si coating formed thereon, favorable results were obtained. The foregoing results are shown in Table 3.

TABLE 3

| | Metal powder | Particle size (μm) | Specific surface area (m²/g) | Surface treatment agent | Treatment concentration (%) | Treatment time (min) | Heat treatment temperature after surface treatment (° C.) | Si adhesion amount (wtppm) |
|---|---|---|---|---|---|---|---|---|
| Example 3-1 | Cu | 38.0 | — | Diaminosilane | 5 | 60 | 800 | 140 |

| | C adhesion amount (wtppm) | Weight ratio C/Si | Variation in oxygen concentration (after heating)/(before heating) | State of powder after temporary sintering test | Change in degree of vacuum during molding |
|---|---|---|---|---|---|
| Example 3-1 | 210 | 1.5 | — | Favorable | — |

Example 4: Production Method of Additive Manufactured Object

The metal additive manufacturing device A2X manufactured by Arcam was used to produce a molded object having a size of 35 mm×35 mm and a thickness of 35 mm. As the raw material, the pure copper powder of Example 1-2 (pure copper powder formed with a Si coating thereon) was used, and as the substrate used was a copper plate having a size of 200 mm×200 mm and a thickness of 20 mm. Moreover, a thermocouple was placed at the center of the back side of the substrate to monitor the preheating temperature.

With Example 4-1 to Example 4-13 and Comparative Example 4-1 to Comparative Example 4-10, as shown in Table 4, the preheating temperature was set to 650° C., and molding was performed by changing the EB accelerating voltage, beam current, and scan speed. Consequently, in Example 4-1 to Example 4-13, there was no unmelted part on the surface of the molded object, and a flat surface was obtained. Meanwhile, in Comparative Example 4-1 to Comparative Example 4-10, there were unmelted parts on the surface of the molded object and, moreover, severe irregularities were confirmed on the surface. These unmelted parts and irregularities occurred because the molding conditions (conditions of the electron beam and the like) were inappropriate. The foregoing results are shown in Table 4.

TABLE 4

| | Metal powder | Si adhesion amount (wtppm) | C adhesion amount (wtppm) | Weight ratio C/Si | Preheating temperature (° C.) | Voltage (kV) | Current (mA) | Beam diameter (mm) |
|---|---|---|---|---|---|---|---|---|
| Example 4-1 | Cu | 64 | 67 | 1.4 | 650 | 60 | 33 | 0.25 |
| Example 4-2 | | 64 | 67 | 1.4 | 650 | 60 | 35 | 0.25 |
| Example 4-3 | | 64 | 67 | 1.4 | 650 | 60 | 28 | 0.25 |
| Example 4-4 | | 64 | 67 | 1.4 | 650 | 60 | 39 | 0.25 |
| Example 4-5 | | 64 | 67 | 1.4 | 650 | 60 | 32 | 0.25 |
| Example 4-6 | | 64 | 67 | 1.4 | 650 | 60 | 34 | 0.25 |
| Example 4-7 | | 64 | 67 | 1.4 | 650 | 60 | 35 | 0.25 |
| Example 4-8 | | 64 | 67 | 1.4 | 650 | 60 | 35.5 | 0.25 |
| Example 4-9 | | 64 | 67 | 1.4 | 650 | 60 | 30.5 | 0.25 |
| Example 4-10 | | 64 | 67 | 1.4 | 650 | 60 | 36.5 | 0.25 |
| Example 4-11 | | 64 | 67 | 1.4 | 650 | 60 | 33.5 | 0.25 |
| Example 4-12 | | 64 | 67 | 1.4 | 650 | 60 | 32.5 | 0.25 |
| Example 4-13 | | 64 | 67 | 1.4 | 650 | 60 | 28.5 | 0.25 |
| Comparative Example 4-1 | | 64 | 67 | 1.4 | 650 | 60 | 25 | 0.25 |

TABLE 4-continued

| | | | | | | | |
|---|---|---|---|---|---|---|---|
| Comparative Example 4-2 | 64 | 67 | 1.4 | 650 | 60 | 22 | 0.25 |
| Comparative Example 4-3 | 64 | 67 | 1.4 | 650 | 60 | 17 | 0.25 |
| Comparative Example 4-4 | 64 | 67 | 1.4 | 650 | 60 | 19 | 0.25 |
| Comparative Example 4-5 | 64 | 67 | 1.4 | 650 | 60 | 26 | 0.25 |
| Comparative Example 4-6 | 64 | 67 | 1.4 | 650 | 60 | 33 | 0.25 |
| Comparative Example 4-7 | 64 | 67 | 1.4 | 650 | 60 | 36 | 0.25 |
| Comparative Example 4-8 | 64 | 67 | 1.4 | 650 | 60 | 38 | 0.25 |
| Comparative Example 4-9 | 64 | 67 | 1.4 | 650 | 60 | 14 | 0.25 |
| Comparative Example 4-10 | 64 | 67 | 1.4 | 650 | 60 | 31 | 0.25 |

| | Scan speed (mm/s) | Thickness of one layer of powder body (mm) | ([voltage] [current])/ ([beam diameter] [scan speed]) | ([voltage] [current])/ ([beam diameter] [scan speed] [thickness]) | Molding condition Surface condition |
|---|---|---|---|---|---|
| Example 4-1 | 2750 | 0.05 | 2.9 | 57.6 | Favorable |
| Example 4-2 | 2160 | 0.05 | 3.9 | 77.8 | Favorable |
| Example 4-3 | 2640 | 0.05 | 2.5 | 50.9 | Favorable |
| Example 4-4 | 2760 | 0.05 | 3.4 | 67.8 | Favorable |
| Example 4-5 | 2400 | 0.05 | 3.2 | 64.0 | Favorable |
| Example 4-6 | 3000 | 0.05 | 2.7 | 54.4 | Favorable |
| Example 4-7 | 2160 | 0.05 | 3.9 | 77.8 | Favorable |
| Example 4-8 | 3010 | 0.05 | 2.8 | 56.6 | Favorable |
| Example 4-9 | 3150 | 0.05 | 2.3 | 46.5 | Favorable |
| Example 4-10 | 2590 | 0.05 | 3.4 | 67.6 | Favorable |
| Example 4-11 | 3290 | 0.05 | 2.4 | 48.9 | Favorable |
| Example 4-12 | 2730 | 0.05 | 2.9 | 57.1 | Favorable |
| Example 4-13 | 2870 | 0.05 | 2.4 | 47.7 | Favorable |
| Comparative Example 4-1 | 3600 | 0.05 | 1.7 | 33.3 | Inferior surface condition |
| Comparative Example 4-2 | 3120 | 0.05 | 1.7 | 33.8 | Inferior surface condition |
| Comparative Example 4-3 | 2520 | 0.05 | 1.6 | 32.4 | Inferior surface condition |
| Comparative Example 4-4 | 2880 | 0.05 | 1.6 | 31.7 | Inferior surface condition |
| Comparative Example 4-5 | 1080 | 0.05 | 5.8 | 115.6 | Inferior surface condition |
| Comparative Example 4-6 | 960 | 0.05 | 8.3 | 165.0 | Inferior surface condition |
| Comparative Example 4-7 | 1320 | 0.05 | 6.5 | 130.9 | Inferior surface condition |
| Comparative Example 4-8 | 720 | 0.05 | 12.7 | 253.3 | Inferior surface condition |
| Comparative Example 4-9 | 1680 | 0.05 | 2.0 | 40.0 | Inferior surface condition |
| Comparative Example 4-10 | 1560 | 0.05 | 4.8 | 95.4 | Inferior surface condition |

According to the embodiments of the present invention, it is possible to suppress the partial sintering of the pure copper powder caused by the preheating thereof in additive manufacturing based on the electron beam (EB) method, and suppress the generation of discoloration and contamination of the additive manufacturing device caused by carbon (C). Consequently, superior effects are yielded in that it is possible to produce an additive manufactured object of a complex shape, and, when a pure copper powder layer is formed but there are portions that were not irradiated with an electron beam, such portions can be reused. Moreover, it is possible to produce a pure copper additive manufactured object having favorable surface conditions. Note that, while it is particularly useful in additive manufacturing based on the EB method, the pure copper powder according to the embodiments of the present invention can also be used in additive manufacturing based on a laser system. The pure copper powder according to the embodiments of the present invention is particularly useful as a pure copper powder for use in a metal 3D printer.

The invention claimed is:

1. A production method of an additive manufactured object according to an EB-based (Electron Beam based) additive manufacturing method of spreading a pure copper powder, preheating the pure copper powder and thereafter partially melting the pure copper powder by scanning the pure copper powder with an electron beam, solidifying the pure copper powder to form a first layer, newly spreading the pure copper powder on the first layer, preheating the pure copper powder and thereafter partially melting the pure copper powder by scanning the pure copper powder with the electron beam, solidifying the pure copper powder to form a second layer, and repeating the foregoing process to add layers, wherein the pure copper powder is the pure copper powder with a Si coating formed thereon in which a Si adhesion amount is 5 to 200 wtppm, a C adhesion amount is 15 wtppm or more, and a weight ratio C/Si is 3 or less, and wherein the preheating temperature is set to be 400° C. or higher and less than 800° C.

2. The production method of an additive manufactured object according to claim 1, wherein molding conditions of the electron beam satisfy a relational expression (I) of ([voltage]×[current])/([beam diameter]×[scan speed])=2.3 or more and 6.0 or less; provided that a unit of each parameter shall be as follows:
    voltage (kV);
    current (mA);
    scan speed (mm/sec); and
    beam diameter (diameter) (mm).

3. The production method of an additive manufactured object according to claim 1, wherein molding conditions of the electron beam satisfy a relational expression (II) of ([voltage]×[current])/([beam diameter]×[scan speed]×[thickness of one layer of powder body])=45 or more and 90 or less; provided that a unit of each parameter shall be as follows:
    voltage (kV);
    current (mA);
    scan speed (mm/sec);
    beam diameter (diameter) (mm); and
    thickness of one layer of powder body (mm).

4. The production method of an additive manufactured object according to claim 1, wherein an average particle size D50 (median diameter) of the pure copper powder is 10 to 150 μm.

5. A production method of an additive manufactured object according to an EB-based additive manufacturing method of spreading a pure copper powder, preheating the pure copper powder and thereafter partially melting the pure copper powder by scanning the pure copper powder with an electron beam, solidifying the pure copper powder to form a first layer, newly spreading the pure copper powder on the first layer, preheating the pure copper powder and thereafter partially melting the pure copper powder by scanning the pure copper powder with the electron beam, solidifying the pure copper powder to form a second layer, and repeating the foregoing process to add layers, wherein the pure copper powder is the pure copper powder with a Si coating formed thereon in which, when Si is analyzed via WDX (Wavelength Disperse X-ray) analysis, portions that are 1/10 or more of a maximum signal strength are 40% or higher of a whole particle, a C adhesion amount is 15 wtppm or more, and a weight ratio C/Si of a Si adhesion amount and a C adhesion amount is 3 or less, and wherein the preheating temperature is set to be 400° C. or higher and less than 800° C.

6. The production method of an additive manufactured object according to claim 5, wherein molding conditions of the electron beam satisfy a relational expression (I) of ([voltage]×[current])/([beam diameter]×[scan speed])=2.3 or more and 6.0 or less; provided that a unit of each parameter shall be as follows:
    voltage (kV);
    current (mA);
    scan speed (mm/sec); and
    beam diameter (diameter) (mm).

7. The production method of an additive manufactured object according to claim 5, wherein molding conditions of the electron beam satisfy a relational expression (II) of ([voltage]×[current])/([beam diameter]×[scan speed]×[thickness of one layer of powder body])=45 or more and 90 or less; provided that a unit of each parameter shall be as follows:
    voltage (kV);
    current (mA);
    scan speed (mm/sec);
    beam diameter (diameter) (mm); and
    thickness of one layer of powder body (mm).

8. The production method of an additive manufactured object according to claim 5, wherein an average particle size D50 (median diameter) of the pure copper powder is 10 to 150 μm.

9. A production method of an additive manufactured object according to an EB-based additive manufacturing method of spreading a pure copper powder, preheating the pure copper powder and thereafter partially melting the pure copper powder by scanning the pure copper powder with an electron beam, solidifying the pure copper powder to form a first layer, newly spreading the pure copper powder on the first layer, preheating the pure copper powder and thereafter partially melting the pure copper powder by scanning the pure copper powder with the electron beam, solidifying the pure copper powder to form a second layer, and repeating the foregoing process to add layers, wherein the pure copper powder is the pure copper powder with a Si coating formed thereon in which a film thickness of the Si coating is 5 nm or more and 300 nm or less, a C adhesion amount is 15 wtppm or more, and a weight ratio C/Si of a Si adhesion amount and a C adhesion amount is 3 or less, and wherein the preheating temperature is set to be 400° C. or higher and less than 800° C.

10. The production method of an additive manufactured object according to claim 9, wherein molding conditions of the electron beam satisfy a relational expression (I) of ([voltage]×[current])/([beam diameter]×[scan speed])=2.3 or more and 6.0 or less; provided that a unit of each parameter shall be as follows:
    voltage (kV);
    current (mA);
    scan speed (mm/sec); and
    beam diameter (diameter) (mm).

11. The production method of an additive manufactured object according to claim 9, wherein molding conditions of the electron beam satisfy a relational expression (II) of ([voltage]×[current])/([beam diameter]×[scan speed]×[thickness of one layer of powder body])=45 or more and 90 or less; provided that a unit of each parameter shall be as follows:
    voltage (kV);
    current (mA);
    scan speed (mm/sec);
    beam diameter (diameter) (mm); and
    thickness of one layer of powder body (mm).

12. The production method of an additive manufactured object according to claim 9, wherein an average particle size D50 (median diameter) of the pure copper powder is 10 to 150 μm.

* * * * *